United States Patent [19]

Trumble et al.

[11] 4,043,314

[45] Aug. 23, 1977

[54] FOOD HEATERS

[75] Inventors: John H. Trumble, Elm Grove; Thomas C. Ehlert, Wauwatosa; Akos Szekely, Colgate, all of Wis.

[73] Assignee: Thermology, Inc., Milwaukee, Wis.

[21] Appl. No.: 615,518

[22] Filed: Sept. 22, 1975

Related U.S. Application Data

[63] Continuation-in-part of Ser. No. 568,404, April 16, 1975, abandoned, which is a continuation-in-part of Ser. No. 545,206, Jan. 29, 1975, abandoned, and Ser. No. 562,352, March 26, 1975.

[51] Int. Cl.$^2$ .............................................. F24J 1/02
[52] U.S. Cl. .................................... 126/263; 126/390
[58] Field of Search .............. 126/263, 346, 390, 367; 165/183; 102/39; 44/38, 40; 252/70; 149/15, 16, 37, 44

[56] References Cited

U.S. PATENT DOCUMENTS

| 2,198,647 | 4/1940 | Wolcott | 99/422 |
| 2,531,548 | 11/1950 | Bennett | 126/263 |
| 2,690,743 | 10/1954 | Flournoy | 126/246 |
| 3,160,537 | 12/1964 | Trafton, Jr. | 149/37 |

FOREIGN PATENT DOCUMENTS 33,939  11/1924  Germany .......................... 126/263

Primary Examiner—John J. Camby
Assistant Examiner—Larry I. Schwartz

[57] ABSTRACT

A heating device useful for a variety of relatively small heating applications is disclosed. The heat source for the device comprises a hermetically sealed cartridge containing a chemical mixture which produces heat, but substantially no gas, upon ignition. The device itself comprises a thermal-conductive body into which the cartridge is inserted and an insulating cover for all but a portion of the body. The body is constructed for optimizing heat transfer from the cartridge to such exposed portion. The exposed portion may be employed as a grill, or a container may be releaseably secured to the exposed portion for use as a warming pan for liquid or semi-solid substances. Alternately, the body may include one or more recesses for receiving specially shaped food items such as sausages, frankfurters or food packets. The use of a plurality of heating cartridges in the device can increase the heating temperature, prolong the useful heating capacity and/or extend the usefulness of the device for heating larger quantities of foods or liquids.

4 Claims, 5 Drawing Figures

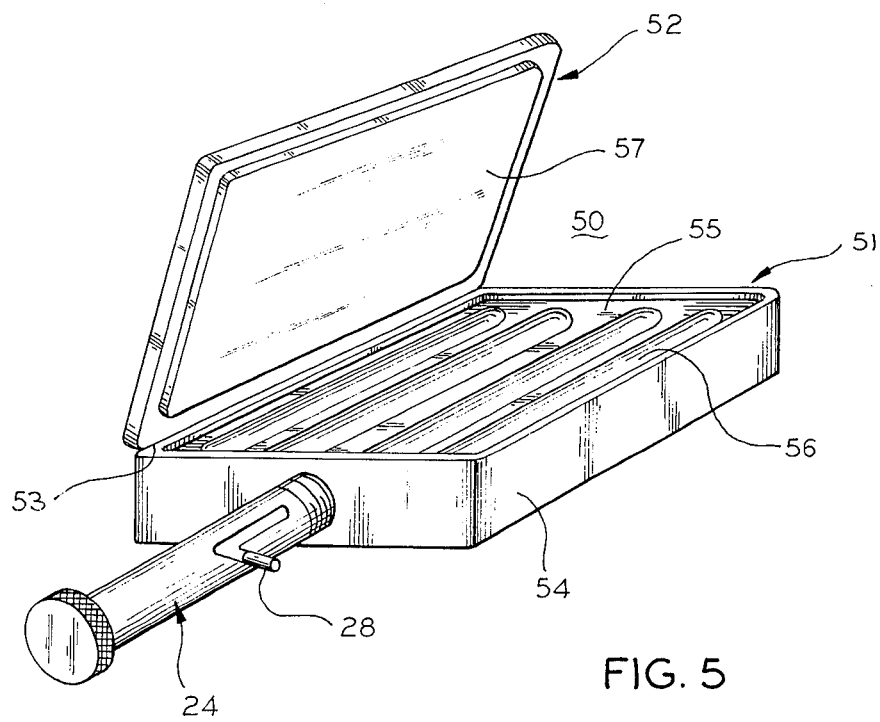

FOOD HEATERS

BACKGROUND OF THE INVENTION

This application is a continuation-in-part of commonly assigned United States patent application Ser. No. 568,404 entitled "Grill and Warming Pan for Use with Chemical Heaters," filed Apr. 16, 1975 now abandoned. That application in turn is a continuation-in-part of commonly assigned U.S. patent application Ser. No. 545,206, filed Jan. 29, 1975 now abandoned and Ser. No. 562,352, filed Mar. 26, 1975.

This invention relates generally to the art of self-contained heating devices and in particular to a grill and/or warming pan employing a chemical heater as the heat source. The aforementioned application. Ser. No. 545,206 now abandoned, describes several prior art chemical heater devices useful for such diverse heating applications as warming foods or drinks, heating shaving water, heating hair curlers, providing concentrated heat for small soldering jobs, etc. As discussed in such co-pending application, the prior art devices suffer from one or more disadvantages including toxicity of the heating chemicals, the inability to control the reaction rate and heat output from the devices, ignition problems, excessive gas pressures in the heating cartridges, etc.

That co-pending application also discloses that several such prior art devices have employed the "Thermite" reaction for producing heat. This reaction can be represented by either of the following formulas:

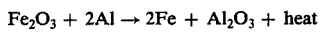

$$Fe_2O_3 + 2Al \rightarrow 2Fe + Al_2O_3 + \text{heat}$$

$$3Fe_3O_4 + 8Al \rightarrow 9Fe + 4Al_2O_3 + \text{heat}$$

While typically employing aluminum and an oxide of iron, the reaction may involve other metals and other oxides as is known to the art. The advantage of this reaction is that theoretically no gas is produced during the reaction "burn" since the supporting oxygen is supplied by the iron oxide and consumed in the formation of aluminum oxide. Prior thermite heaters also suffer one or more of the above-mentioned drawbacks including high toxicity of ignition mixtures which precludes use of the devices for heating foods and drinks, the lack of control over the reaction rate and corresponding heat output of the device, excessive gas pressures in the heating cartridges, etc. A number of the patents discussed in U.S. patent application Ser. No. 545,206 now abandoned, relate to Thermite heaters.

According to application Ser. No. 545,206, now abandoned, the efficiency of alumino-thermic reactive heaters can be increased by thermally or chemically retarding the reaction burn rate, utilizing the discovery that the burn time of heating cartridges of this type is dependent not only on the chemical mixture employed, but on the heat conductivity characteristics of the cartridge and the temperature and heat conductivity characteristics of the environment surrounding the cartridge. Thermal control can be accomplished by varying such heat conductivity characteristics by increasing the cartridge burn time, for example by dividing the chemical mixture into a plurality of portions and causing a series reaction through one portion at a time, or thermal control may be accomplished by providing a plug of inert material at the core of the reactive chemical mixture. Chemical control, on the other hand, is accomplished by adjusting the reaction stoichiometry or by adding suitable retardants. Either or both of these techniques has been found to be highly effective in increasing the reaction burn time and maximizing the ability to transfer heat from the cartridge to the surrounding environment.

Another commonly assigned Co-pending application, Ser. No. 562,352, filed Mar. 26, 1975, relates specifically to one problem encountered with prior art Thermite heaters, i.e., ignition problems. While the invention described and claimed therein is not limited to the use of percussion ignition systems, it was discovered that conventional small arm primers had a tendency to merely glaze, rather than ignite compressed slugs of Thermite reactants. To overcome such problems, co-pending application. Ser. No. 562,352, discloses an ignition technique for Thermite heating cartridges which involves the formation of a cone-shaped depression in a slug of Thermite reactants and filling the cone with a more easily ignitable chemical ignition mixture. Such cartridges may be successfully ignited by conventional primers, thus eliminating a significant obstacle to commercial development of the chemical heater market. Details of the chemical heater cartridges and ignition systems of the two parent applications will be recited in the description of the present invention, but the alternate embodiments and modifications mentioned therein are also useful according to the present invention, so the disclosures of said co-pending applications are expressly incorporated herein by this reference.

The heating cartridges disclosed in the prior applications were described as being useful, among other things, in portable heating guns having heat conductive sleeve surrounding the cartridge for transferring heat from the cartridge to a liquid or semi-solid into which the sleeve was immersed. It would also be described to employ such heating cartridges for conventional food warming and heating jobs such as grilling sandwiches and meats, cooking eggs, frankfurters, sausages, heating soups and casseroles, and heating specially shaped food packages. It would also be desirable to use such cartridges for heating water for the field sterilization of surgical instruments and the like.

OBJECTS OF THE INVENTION

It is a primary object of the present invention to provide a grill and/or warming pan constructed for receiving a chemical heating cartridge of the type which upon ignition produces substantial amounts of heat without significant production of gas.

Another object of the present invention is to provide a grill and/or warming pan device which is constructed and arranged for maximizing heat transfer from a chemical heating cartridge inserted therein to the heating surface of the device.

A further object of the present invention is to provide a self-contained heating device which may be converted from a grill to a warming pan.

A still further object of the present invention is to provide a self-contained heating grill, a portion of which is insulated so that the device may be safely used in a variety of locations.

Another object of the invention is to provide a self-contained heating grill which includes a heating surface having one or more recesses for receiving shaped food products such as frankfurters or sausages or packages containing food or liquid.

How these and other objects of the present invention are accomplished will be described in the following specification talken in conjunction with the drawings. Generally, however, the device comprises a heating grill prepared from aluminum or other thermo-conductive material which is provided with an internal cavity for receiving a chemical heating cartridge. The grill body also comprises means for releasably securing a cartridge ignition device to the body. The thermal-conductive body of the heating grill is arranged and constructed for maximizing heat transfer from the metal surrounding the cartridge to an exposed portion of the grill, while other portions of the grill are covered with thermo-insulating material. This combination insures maximum heat transfer from the cartridge to the exposed portion of the grill. The grill temperature and the length of time that the grill remains useful for a particular heating job can each be varied by successively disposing additional cartridges within the body chamber or by providing a plurality of chambers and heating cartridges within the body. The temperature of the grill and the useful heating time for each cartridge is dependent on the heat output from each cartridge, which may vary depending on the size thereof. A preferred embodiment of the present invention includes a pan or warming tray which may serve as a cover for the unit or when inverted may be releasably secured in a heat conducting relationship to the exposed grill. A further preferred embodiment of the present invention includes providing the exposed portion of the grill with one or more recesses for receiving frankfurters, sausages or other specially shaped packages of food or liquid. It will become obvious upon reading the description of the preferred embodiments, that the size and arrangement of such recesses may be varied to accommodate many different shaped food items.

DESCRIPTION OF THE DRAWINGS

FIG. 5 is a perspective view of a particular form of heating grill according to the present invention adapted for the purpose of heating frankfurters or other similarly-shaped, elongate food items and a cover therefor.

DESCRIPTION OF THE PREFERRED EMBODIMENTS

Figure 1:
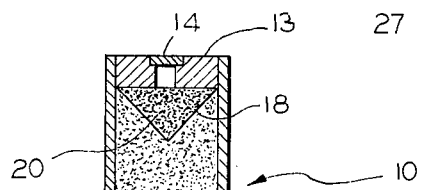
FIG. 1 is a cross-section of one preferred form of heating cartridge useful in the present invention.

FIG. 1 illustrates one preferred form of heating cartridge useful according to the present invention. The cartridge 10 is shown in cross-section to include a generally cylindrical steel shell 11 closed at one end such as by a metallic plug 12 and closed at its opposite end by a primer cap 13 which in turn includes a centrally located explosive charge 14. Filling cartridge 10 is a quantity of alumino-thermic reactive chemicals 16 which is compressed in the form of a slug and which includes a cone-shaped depression 18 formed at its end adjacent primer 13. The depression is filled with a lightly packed mixture of a different reactive chemical mixture 20, all as discussed in greater detail herein below. It should be emphasized at the outset that other heating cartridges may be used according to the present invention, and the invention is not to be limited to the cartridge shown in FIG. 1. Many modifications are known to the art and other configurations for the ignition mixture and reactive chemical mixture may be employed. Likewise, other ignition systems than primer ignition are known to the chemical heating art, which ignition systems are equally applicable to the heating grill and warming pans described herein. For example, electrical and chemical ignition systems may also be employed for igniting the reactive mixture 16 within cartridge 10.

Cartridge 10 in one preferred form is constructed from a steel tube approximately 3½ inches in length, 0.625 inch in diameter with a wall thickness of 0.050 inch. Stainless steels are suitable for constructing cartridge 10, but other high temperature resistant materials such as other metals or porcelain may be used. Great strength is not a prerequisite for the materials used in constructing cartridge 10, as little gas is produced upon ignition. Primer 13 may be selected from those commercially available primers manufactured in the United States, and such primers will not be described in detail as they form no part of the present invention.

Dealing next with the reactive chemical mixture 16 to be used in cartridge 10, it has been found that the preferred reactive mixture when considering cost, toxicity, heat output and safety is a mixture of aluminum, iron oxide and one or more suitable retardant materials. As mentioned previously, other metals or other oxide materials can be employed in the basic Thermite reaction in place of the aluminum and iron oxide. Furthermore, the iron oxide may be either $Fe_2O_3$ or $Fe_3O_4$. In the preferred embodiment of the present invention the chemical mixture is selected from those comprising approximately 0.75 to 1.25 parts-by-weight aluminum, approximately 1.50 to 3.50 parts-by-weight of an iron oxide and approximately 0.25 to 2.50 parts-by-weight of a suitable retardant, such as a 1-2½ mixture of such ingredients. The reaction rate and heat output of a given weight of reactants can vary widely by varying the stoichiometry within these ranges. Anhydrous chemicals (or as nearly anhydrous as practical from a cost standpoint) are preferably employed to avoid generation of steam, hydrogen or other gases in the cartridge during the reaction. The retardant or diluent may be selected from such materials as clay, silica, sand, aluminum oxide, graphite, MgO, $TiO_2$, etc. Diluents are to be avoided which release gaseous products when heated to the high temperatures generated in cartridge 16.

The chemical mixture is compressed within cartridge 16 at a pressure ranging from approximately 500-20,000 psi or more to yield a tightly compressed slug which generates little gas on ignition and burning. A cartridge as just described may generate between 15-25,000 calories of heat.

The cone-shaped depression 18 in the slug of reactive materials 16 may have a depth of approximately ⅜ inch in the preferred embodiment of the present invention. Variations, of course, from this size are within the scope of the invention and such distance may be varied depending on the overall size of heating cartridge 10 and the type of percussion primer 13 which is employed. The depression 18 may be formed in mixture 16 by the packing rod used to compress the mixture within cartridge 16 or may be formed in any other suitable manner.

Material 20 to be inserted in depression 18 may be a lightly compressed mixture of a ⅓ mixture of 325 mesh aluminum and $Fe_2O_3$ but other mixtures may be employed and are selected from those ignition mixtures which are capable of burning in an enclosed atmosphere at a temperature sufficient to ignite mixture 16 and which are themselves more easily ignitable than mixture 16. Nontoxic reactants are preferred, especially in embodiments where inadvertent cartridge rupture could contaminate liquid or solid foods.

As disclosed in co-pending application, Ser. No. 562,352 this ignition system works most effectively if the area of mixture 15 adjacent the cone-shaped portion is packed at a lower pressure than the remaining portion of mixture 16.

Figure 2:
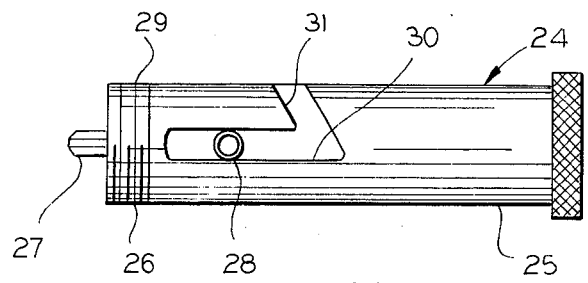
FIG. 2 is a side view of one form of ignition device for the heating cartridge shown in FIG. 1.

FIG. 2 illustrates a firing pin unit 24 which includes a hollow tubular body 25 for containing a spring-loaded firing pin 27 and a trigger catch pin 28. In the disclosed embodiment, a spring (not shown) forces the firing pin to the position shown in FIG. 2 against a firing pin seat (also not shown) which closes end 26 of firing pin 24 except for a small hole in its middle. By retracting trigger catch pin 28 along slot 30 which runs longitudinally of the axis of firing pin mechanism 24, the firing pin 27 is retracted through the firing pin seat into body 25. Trigger catch pin 28 can be locked in the ready position, for example, by sliding it into an angular portion 31 of slot 30. The firing pin unit 24 has not been described in detail because such mechanisms, in and of themselves, are well-known. For example, reference is made to U.S. Pat. No. 1,826,562, issued to Minto on Oct. 6, 1931 for a "Gas Gun." Firing pin 24 may be constructed of any suitable material, but since large amounts of heat are generated by cartridge 10 it is desirable to construct unit 24 from a relatively non-conducting material, or alternately, to coat unit 24 with a heat insulating material to allow the user to safely handle the ignition device and remove it from the heating grill.

Figure 3:
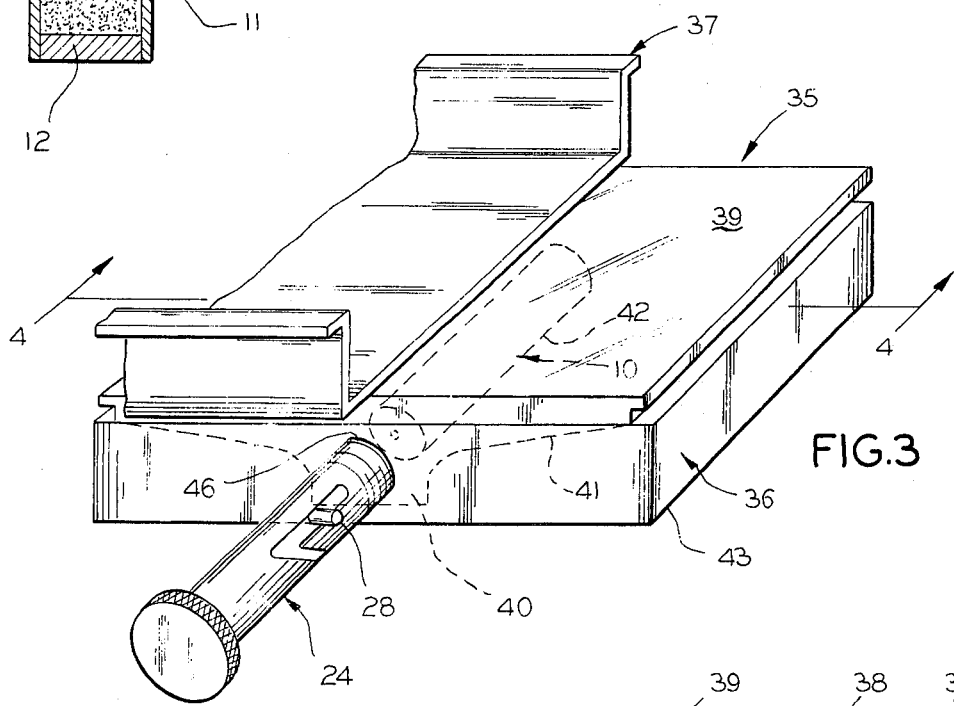
FIG. 3 is a perspective view of a heating grill and warming pan assembly according to the present invention, partially in section, with the warming pan in the operating position and the ignition means releasably secured to the grill body.
Figure 4:
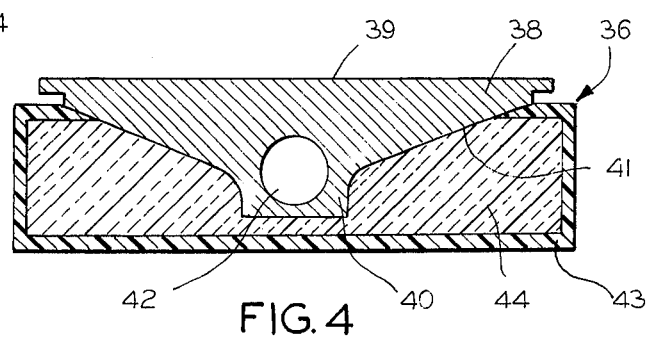
FIG. 4 is a cross-section taken along the line 4—4 of FIG. 3 and illustrating the arrangement of the thermo-conductive grill body and the thermo-insulative components associated therewith.

FIGS. 3 and 4 illustrate one preferred form of a grill and heating pan device according to the present invention. The device 35 consists of a grill 36 and an optional cover or warming pan 37. While device 35 may be prepared in a wide variety of sizes and shapes, for purposes of illustration, grill 36 is approximately 4¾ × 4¾ × 1½ inches. The internal dimension of cover 37 are selected so that the cover 37 may be inverted from the position shown in FIG. 3 to enclose grill 36 when not in use.

Grill 36 itself comprises three components: a thermoconductive heater 38, an insulating jacket 43 and thermo-insulating material 44 intermediate the lower portion of heater 38 and jacket 43. Heater 38 is preferably constructed of aluminum, but other heat conductive materials can be substituted therefor.

The upper or heating surface 39 of heater 38 is a flat square surface in the illustrated embodiment, but according to the present invention the lower surface is not flat, but instead of constructed and arranged for maximizing heating efficiency. A relatively thick portion 40 of heater 38, preferably being generally rectangular in shape and oriented intermediate and parallel to two opposing sides of grill 36, is provided to act as a heat sink for heat produced by a heating cartridge 10 to be inserted therein. The bottom portion 41 of heater 38 intermediate said heat sink portion 40 and said opposing sides are generally concave so that heater 38 appears generally T-shaped in cross-section. A cylindrical cavity 42 is provided in portion 40 to accommodate a heating cartridge 10. Any shape may be employed for the lower portion of heater 38 so long as the heat sink concept is utilized.

Jacket 43 encloses the lower portion of heater 38 and is preferably constructed of ABS resin, fiberglass or other suitable insulting material. Jacket 43 together with portion 40 and 41 of heater 38 define two cavities beneath the heating surface 39 as well as a space adjacent each end of portion 40. Such cavities and spaces are filled according to the present invention with insulation 44 in foam, fiber or particulate form. One example of suitable insulation is Johns Mansville insulation. Jacket 43 includes a threaded opening 46 aligned with cavity 42 in heater 38 for receivably engaging threads 29 of ignition device 24. Jacket 43 may be attached to heater 38 in any manner such as by an adhesive or the components can snugly engage one another. FIG. 3 illustrates the ignition device in the operative position (with the firing pin in the retracted position) and a heating cartridge 10 disposed within cavity 42.

Extensive experimentation as to the arrangement of heater 38 indicates that the arrangement shown in FIGS. 3 and 4 is preferred from the standpoint of efficiently conducting heat from cartridge 10 to surface 39 of heater 38. The insulation 44 prevents dissipation of heat through jacket 43 and also allows grill 36 to be used on a variety of surfaces without danger of fire or injury. In fact, grill 36 may be held on the user's lap or placed on a car seat, kitchen counter, tent floor, etc. without danger.

In operation, the heating cartridge 10 is inserted through the opening 46 in jacket 43 and heating ignition device 24 is then screwed into opening 46. Trigger catch pin 28 is retracted to the cocked position and subsequently released to ignite primer explosive 14 which in turn ignites ignition mixture 18 in cartridge 10. Ignition mixture 18, as more fully described above, will then burn with sufficient heat to ignite the slug of alumino-thermic reactants 16. The heat generated within cartridge 10 is tranferred through the shell 11, to the heat sink portion 40 and finally to the heating surface 39 of heater 38.

If it is desired to increase or prolong the heat at surface 39, additional cartridges may be ignited in succession in chamber 42 or heater 38 may be provided with a plurality of cavities 41 and a cartridge 10 inserted into each cavity. Cartridges may be ignited simultaneously for maximum temperature or may be ignited successively for prolonging a lesser temperature at surface 39. An additional embodiment of the present invention comprises constructing grill 36 in a rectangular, rather than a square configuration and providing two or more cartridges in cavity 41 in an end-to-end relationship. The heat generated by the first cartridge will ignite primer 13 of the second cartridge as the burn proceeds toward the plug 12 of the first cartridge. Any number of variations will appear to one skilled in the art and the heating characteristics of grill 36 can be tailored to the particular heating jobs to be accomplished.

If it is desired to heat liquids or semi-solid substances on grill 36, the cover 37 may be placed on surface 39 in heat-conducting relationship therewith to serve as a warming pan. Preferably, cover 37 is also constructed from aluminum or other thermo-conductive material. Other heating containers such as conventional pans, coffee pots and the like may, of course, be used in place of cover 37. It is also preferable to provide means for releasably securing cover 37 to grill 36. One way of accomplishing this is to provide a stub bolt (not shown) on either pan 37 or heater 38 and a corresponding threaded opening therefor in the other component. Using this attachment technique the cover 37 can be spun into tight engagement with surface 39 to prevent its accidentally being knocked off during use.

EXAMPLE I.

The following calorimetry and food warming experiments were conducted using an aluminum grill body weighing approximately 290 grams. The grill surface was approximately 4¾ × 4¾ inches and a warming pan as shown in the FIGURES was employed.

A. CALORIMETRY

| | Water ml | Cartridge Length | Starting Temp. °C | Final Temp. °C | Heating Time, Sec. | Useful Calories |
|---|---|---|---|---|---|---|
| a. | 240 | 3.25 | 19 | 64 | 75 | 10,800 |
| b. | 240 | 3.5 | 17 | 66 | 90 | 11,760 |
| c. | 240 | 4.0 | 19 | 73 | 105 | 12,960 |

B. FOOD

| | Material | Cartridge Length | Heating Time, Sec. | Notes-Results |
|---|---|---|---|---|
| a. | 2 eggs scrambled | 3.25 | 45 | Complete cooking, no scorching |
| b. | Pork & beans 8 oz. | 3.5 | 60 | Warmed through, 75° C. temperature, no scorching |

The heating device illustrated in FIGS. 3 and 4 has a wide variety of uses. In addition to using device 35 for heating food substances, the device is useful for heating water for field sterilization of surgical instruments and the like.

FIG. 5 illustrates a further embodiment of the present invention and shows a heater 50 for specially shaped food items to include a primary heating unit 51 and a cover 52. Cover 52 is shown in the FIGURE to be hinged to a first side 53 of unit 51, but cover 52 may be separate from the heater 50. The hinges are not shown in FIG. 5.

The main heating unit 51 is similar in numerous respects to unit 36 previously described and includes an insulating outer jacket 54 and an aluminum or other thermo-conductive heating body 55. This embodiment however, differs from the warming pan and grill embodiment in that body 55 is provided with a plurality of elongate recesses 56 for receiving specially shaped food items. In the illustrated embodiment there are 4 such elongate recesses sized for receiving frankfurters.

An additional feature of FIG. 5 is an aluminum or other thermo-conductive insert 57 on the surface of cover 52 designed for covering body 55. Such an insert is provided for more uniform and thorough heating of the substance provided in recesses 56.

It should be realized that FIG. 5 represents only one of many possible designs using the concepts described in the present application as recesses 56 can be modified to provide for heating of any of a number of other shaped food items. For example, the military services have in recent years developed foil packets for food which are designed to be heated by electrical energy. These packages are pillow shaped and could be heated by the chemical heater of the present invention by providing a pillow shaped recess in body 55. Accordingly, while the present invention has been described in connection with two preferred embodiments, the invention is not to be limited thereby but is to be limited solely by the claims which follow.

We claim:

1. A heating device comprising:
   a thermo-conductive body having a heating surface, said surface having a pair of opposed parallel sides,
   said body including a relatively thick elongate portion beneath said surface and oriented generally parallel to a first one of said pair of sides and substantially intermediate therebetween said body being generally thinner beneath said surface adjacent said first pairs of sides,
   means defining an elongate cavity within said elongate portion of said body,
   chemical heater means disposed within said cavity, said heater means comprises a cylindrical shell closed at a first end and closed at its second end by percussion ignition means, said shell containing a quantity of compressed alumino-thermic reactive material ignitable by the discharge of said ignition means, firing pin means for igniting said heater,
   enclosure means enclosing substantially all but the heating surface of said body, said enclosure means comprising a generally planar wall disposed beneath said heating surface and parallel thereto and four side walls perpendicular to said planar wall, and
   insulating means within said enclosure means and surrounding said body means beneath said heating surface for preventing substantial dissipation of heat from said body means other than through said heating surface.

2. The invention set forth in claim 1 wherein said heating surface comprises at least one recess for receiving an item to be heated.

3. The invention set forth in claim 2 wherein said heating surface includes a plurality of elongate recesses therein for receiving items to be heated.

4. The invention set forth in claim 1 wherein said device additionally comprises a cover for at least said heating surface of said device, said cover comprising a thermo-conductive surface and an insulating surface.

* * * * *